(12) United States Patent
Fu

(10) Patent No.: US 8,763,967 B2
(45) Date of Patent: Jul. 1, 2014

(54) MOUNTING APPARATUS FOR HARD DISK DRIVE

(75) Inventor: Li-Ren Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/456,249

(22) Filed: Apr. 26, 2012

(65) Prior Publication Data

US 2013/0256490 A1 Oct. 3, 2013

(30) Foreign Application Priority Data

Apr. 2, 2012 (CN) .......................... 2012 1 0095530

(51) Int. Cl.
| | |
|---|---|
| *A47B 96/00* | (2006.01) |
| *A47G 1/10* | (2006.01) |
| *A47F 7/00* | (2006.01) |
| *H05K 7/00* | (2006.01) |
| *A47B 95/00* | (2006.01) |

(52) U.S. Cl.
USPC .................. 248/221.11; 248/316.1; 211/26.2; 361/679.33; 312/333

(58) Field of Classification Search
USPC ........................... 361/679.33, 679.37, 679.31; 248/220.22, 221.11, 222.11, 229.11, 248/316.1; 211/26.2; 312/332.1, 333
See application file for complete search history.

(56) References Cited

U.S. PATENT DOCUMENTS

| | | | | |
|---|---|---|---|---|
| 6,370,022 | B1 * | 4/2002 | Hooper et al. | 361/679.33 |
| 6,377,447 | B1 * | 4/2002 | Boe | 361/679.33 |
| 6,654,240 | B1 * | 11/2003 | Tseng et al. | 361/679.33 |
| 7,017,875 | B2 * | 3/2006 | Chen et al. | 248/300 |
| 7,061,756 | B2 * | 6/2006 | Wu | 361/679.33 |
| 7,327,565 | B2 * | 2/2008 | Chen et al. | 361/679.33 |
| 7,330,348 | B2 * | 2/2008 | Chen et al. | 361/679.33 |
| 7,355,846 | B1 * | 4/2008 | Chen et al. | 361/679.33 |
| 7,450,376 | B2 * | 11/2008 | Chen et al. | 361/679.33 |
| 7,495,908 | B2 * | 2/2009 | Zhang et al. | 361/679.33 |
| 7,841,565 | B2 * | 11/2010 | Peng et al. | 248/27.1 |
| 7,864,520 | B1 * | 1/2011 | Liu | 361/679.33 |
| 8,059,395 | B2 * | 11/2011 | Zhang et al. | 361/679.33 |
| 8,085,530 | B2 * | 12/2011 | Zhang et al. | 361/679.33 |
| 2002/0044427 | A1 * | 4/2002 | Le et al. | 361/726 |
| 2005/0121581 | A1 * | 6/2005 | Chen et al. | 248/316.8 |
| 2006/0232924 | A1 * | 10/2006 | Liu et al. | 361/685 |
| 2006/0245160 | A1 * | 11/2006 | Zhang et al. | 361/685 |
| 2007/0035922 | A1 * | 2/2007 | Jiang et al. | 361/685 |
| 2007/0235625 | A1 * | 10/2007 | Liang et al. | 248/675 |
| 2011/0128693 | A1 * | 6/2011 | Zhang et al. | 361/679.33 |
| 2011/0141683 | A1 * | 6/2011 | Zhang et al. | 361/679.33 |

* cited by examiner

*Primary Examiner* — Jonathan Liu
*Assistant Examiner* — Chiedu Chibogu
(74) *Attorney, Agent, or Firm* — Novak Druce Connolly Bove + Quigg LLP

(57) ABSTRACT

A mounting apparatus for mounting a hard disk drive (HDD) is provided. The HDD includes two opposite sidewalls each defining a positioning hole. The mounting apparatus includes a supporting plate and a fixing assembly. The fixing assembly includes a positioning member mounted on the supporting plate, a latching member fixed to the positioning member, and an operation member slidably sandwiched between the positioning member and the latching member. The latching member includes a resilient latching portion with a latching post. The operation member includes an abutting block slidably abutting against the latching portion, to bias the latching post to latch into or disengage from one of the positioning holes of the HDD.

6 Claims, 8 Drawing Sheets

MOUNTING APPARATUS FOR HARD DISK DRIVE

BACKGROUND

1. Technical Field

The present disclosure relates to mounting apparatus, and particularly to a mounting apparatus for a hard disk drive.

2. Description of Related Art

In an electronic device, hard disk drives are usually fixed in a chassis of the electronic device by a plurality of fasteners or screws. However, it is time-consuming and often difficult to assemble or disassemble the hard disk drives to or from the electronic device.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references can mean "at least one."

Figure 1:
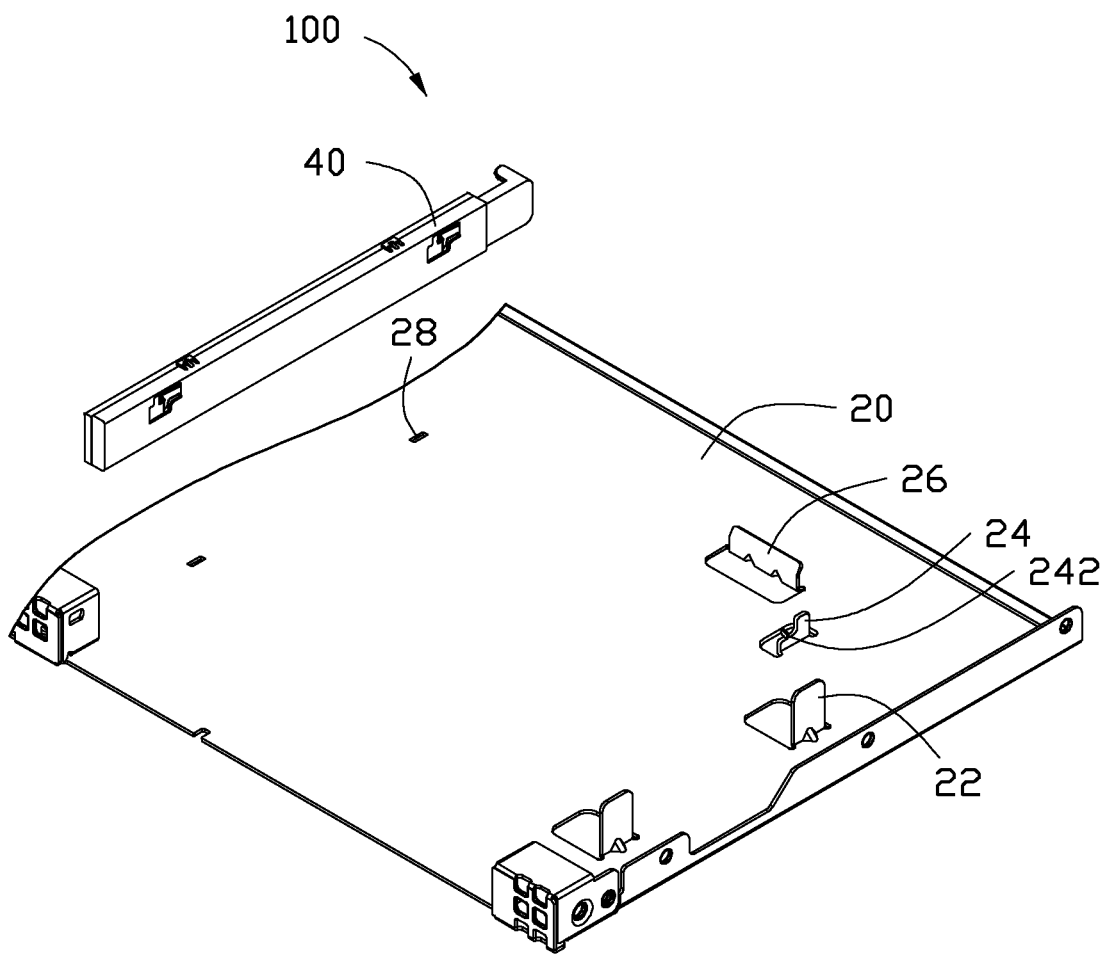
FIG. 1 is a partially exploded, isometric view of an exemplary embodiment of a mounting apparatus, wherein the mounting apparatus includes a fixing assembly.
Figure 2:
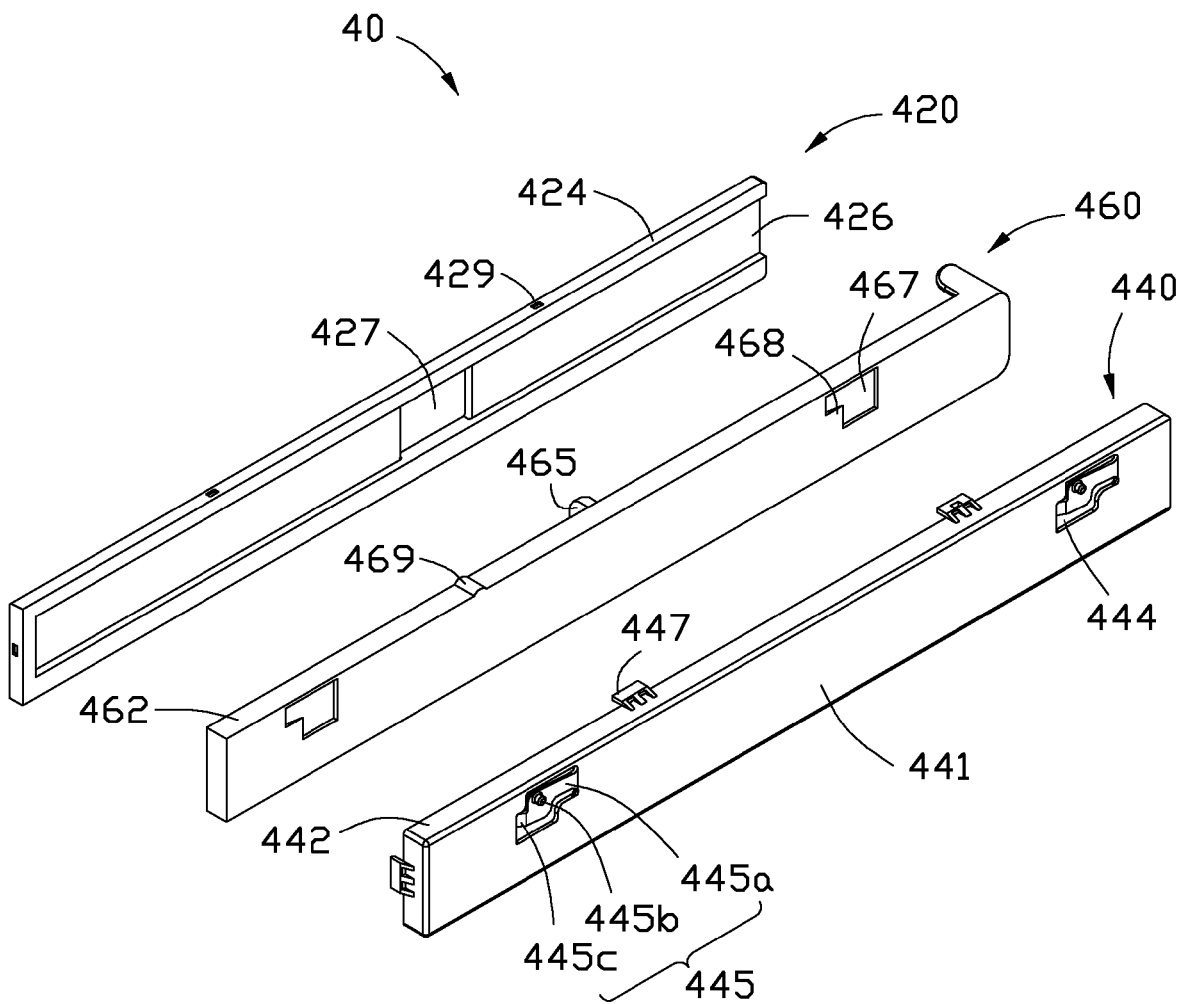
FIG. 2 is an exploded, isometric view of the fixing assembly of FIG. 1.
Figure 3:
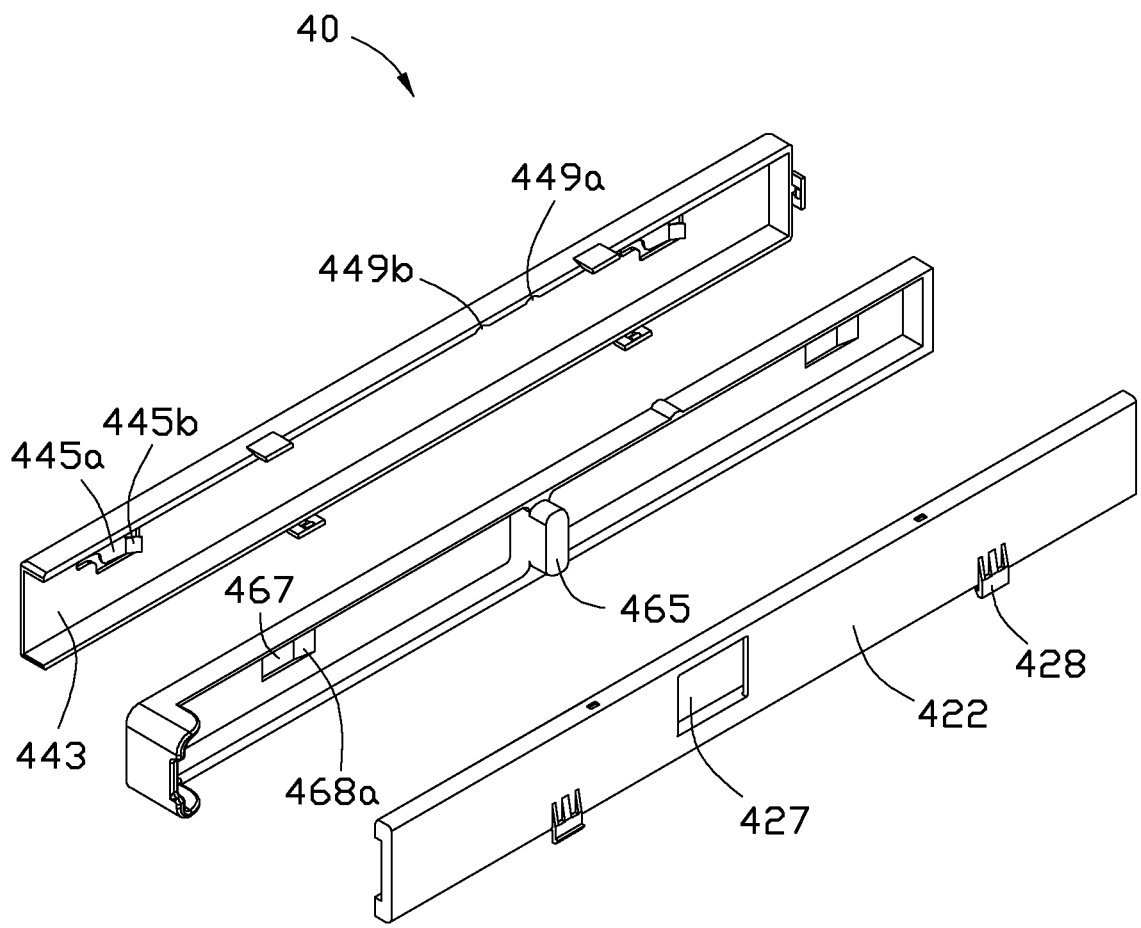
FIG. 3 is an inverted view of FIG. 2.
Figure 4:
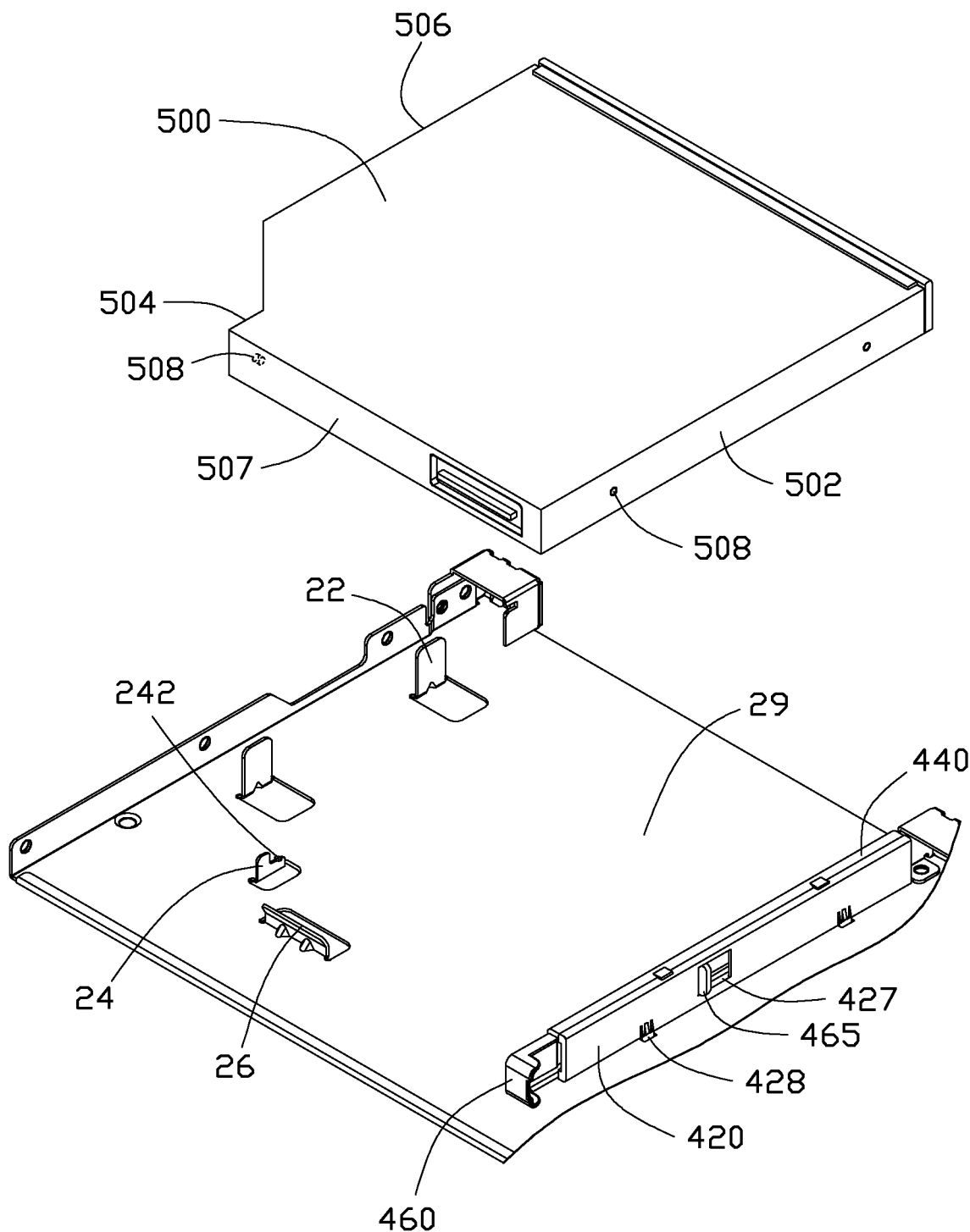
FIGS. 4-6 are isometric views of the process of assembling a hard disk drive to the mounting apparatus.

FIGS. 1-4, show an exemplary embodiment of a mounting apparatus 100 provided for mounting a hard disk drive 500. The hard disk drive 500 includes a first sidewall 502, a second sidewall 504 and a third sidewall 506 offsettingly connected to each other and opposite to the first sidewall 502, and an end wall 507 perpendicularly connecting the first sidewall 502 and the second sidewall 504. The first sidewall 502 defines two positioning holes 508, and the second sidewall 504 defines a positioning hole 508. The mounting apparatus 100 includes a supporting plate 20 and a fixing assembly 40.

The supporting plate 20 is substantially rectangular, two parallel first positioning pieces 22 extend up from a first end of the supporting plate 20, a latching piece 24 protrudes up from the first end of the supporting plate 20 parallel to the first positioning pieces 22, and a second positioning piece 26 extending up from a side of the first end of the supporting plate 20 perpendicular to the first positioning pieces 22. A second end of the supporting plate 20 opposite to the first end defines two fixing holes 28. A hook 242 protrudes from a distal end of the latching piece 24 toward the second end.

The fixing assembly 40 includes a positioning member 420, a latching member 440, and an operation member 460.

The positioning member 420 includes a rectangular positioning plate 422, and a flange 424 protruding out from two lateral sides and an end side of the positioning plate 422 leaving an opening at the other end side. The positioning plate 422 and the flange 424 cooperatively bound a receiving slot 426. A middle of the positioning plate 422 defines a rectangular guide hole 427 along a lengthwise direction of the positioning plate 422. Two opposite hooks 428 extend down from a bottom portion of the positioning plate 422. An outer surface of the flange 424 defines a plurality of latching slots 429.

The latching member 440 includes a rectangular connecting plate 441, and a peripheral plate 442 extending out from two lateral sides and an end side of the connecting plate 441 leaving an opening at the other end side. The connecting plate 441 and the peripheral plate 442 cooperatively bound a slide slot 443. Two opposite ends of the connecting plate 441 each define a through hole 444. A cantilever-shaped latching portion 445 extends in from an end wall of each through hole 444 adjacent to the opening of the slide slot 443. Each latching portion 445 includes a resilient extending piece 445a obliquely extending from the connecting plate 441 into the corresponding slide slot 443, a guiding piece 445c obliquely extending from a lower portion of a distal end of the extending piece 445a into the slide slot 443, and a latching post 445b perpendicularly extending out from an upper portion of the distal end of the extending piece 445a away from the slide slot 443. A plurality of hooks 447 extend out from the peripheral plate 442. An inner surface of the peripheral plate 442 defines a first cutout 449a and a second cutout 449b, wherein the second cutout 449b is nearer than the first cutout 449a to the opening of the slide slot 443.

The operation member 460 includes a rectangular slide plate 462 and an operation portion 465 protruding out from a middle of the slide plate 462. Two opposite ends of the slide plate 462 each define a receiving hole 467. A wedge-shaped abutting block 468 extends in from a bottom corner of each receiving hole 467 opposite to the corresponding latching portion 445. A side surface of each abutting block 468 adjacent to the operation portion 465 defines a guiding surface 468a. A semi-cylindrical protrusion 469 protrudes from a lateral sidewall of the slide plate 462.

In assembling the fixing assembly 40, the operation member 460 is sandwiched between the positioning member 420 and the latching member 440. The operation portion 465 is slidably received in the guide hole 427 of the positioning member 420. The flange 424 of the positioning member 420 and the peripheral plate 442 of the latching member 440 abut against each other, with the hooks 447 engaging into the corresponding latching slots 429. The slide plate 462 is slidably received in the space defined by the receiving slot 426 of the positioning member 420 and the slide slot 443 of the latching member 440. The distal end of each extending piece 445a and the corresponding guiding piece 445c extend through the corresponding receiving holes 467. Each guiding piece 445c aligns with the corresponding guiding surface 468a. The protrusion 469 is positioned in either the first cutout 449a or the second cutout 449b, to selectively keep the operation member 460 in a first position or a second position. In the first position, an end wall of each receiving hole 467 opposite to the corresponding abutting block 468 presses the corresponding latching portion 445, to force the extending piece 445a into the corresponding through hole 444, such that the latching posts 445b extend beyond an outer surface of the connecting plate 441. In the second position each guiding surface 468a presses the distal end of the corresponding extending piece 445a, to force the latching posts 445b back in the slide slots 443.

In assembling the fixing assembly 40 to the supporting plate 20, the hooks 428 are inserted into the corresponding fixing holes 28, with the connecting plate 441 facing the first positioning pieces 22. The fixing assembly 40, the first and second positioning pieces 22 and 26, and the latching piece 24 cooperatively bound a receiving space 29 for receiving the hard disk drive 500.

Figure 5:
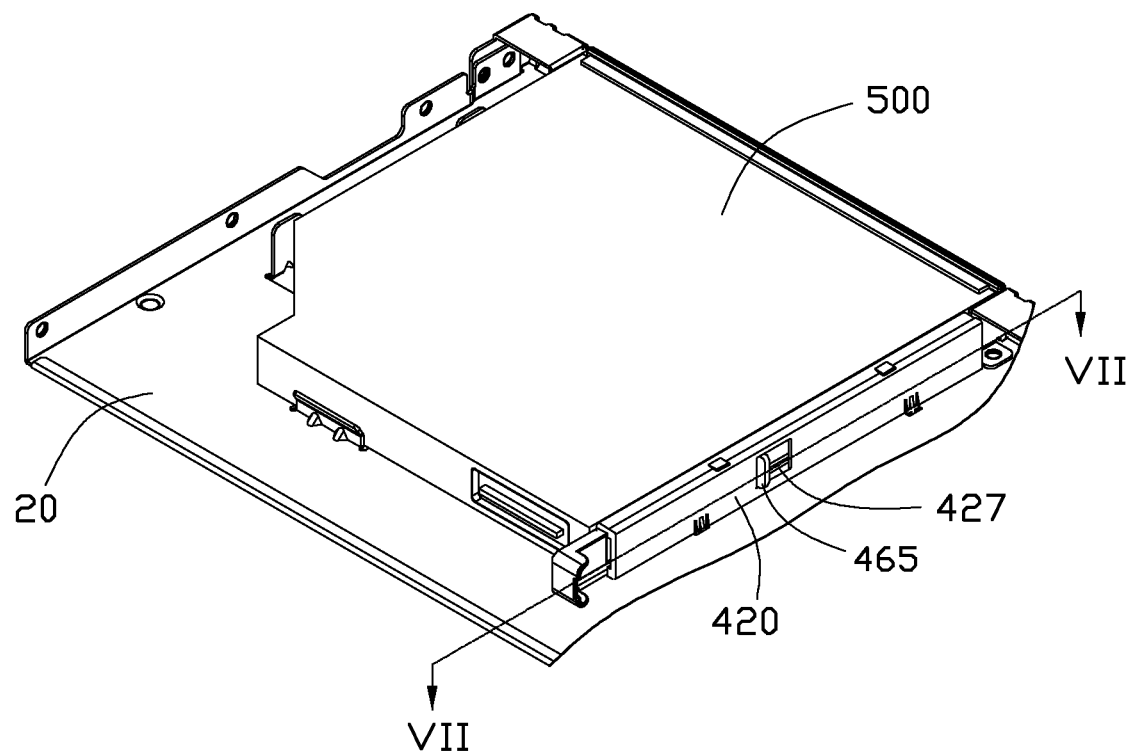
Figure 6:
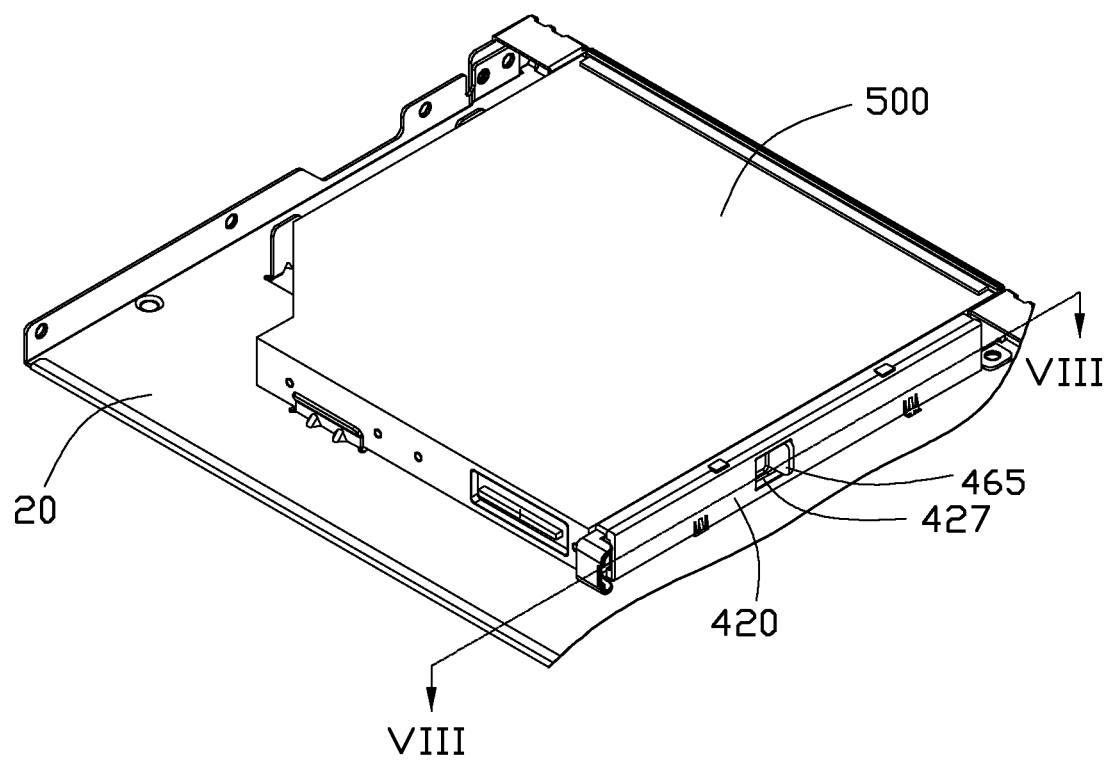
Figure 7:
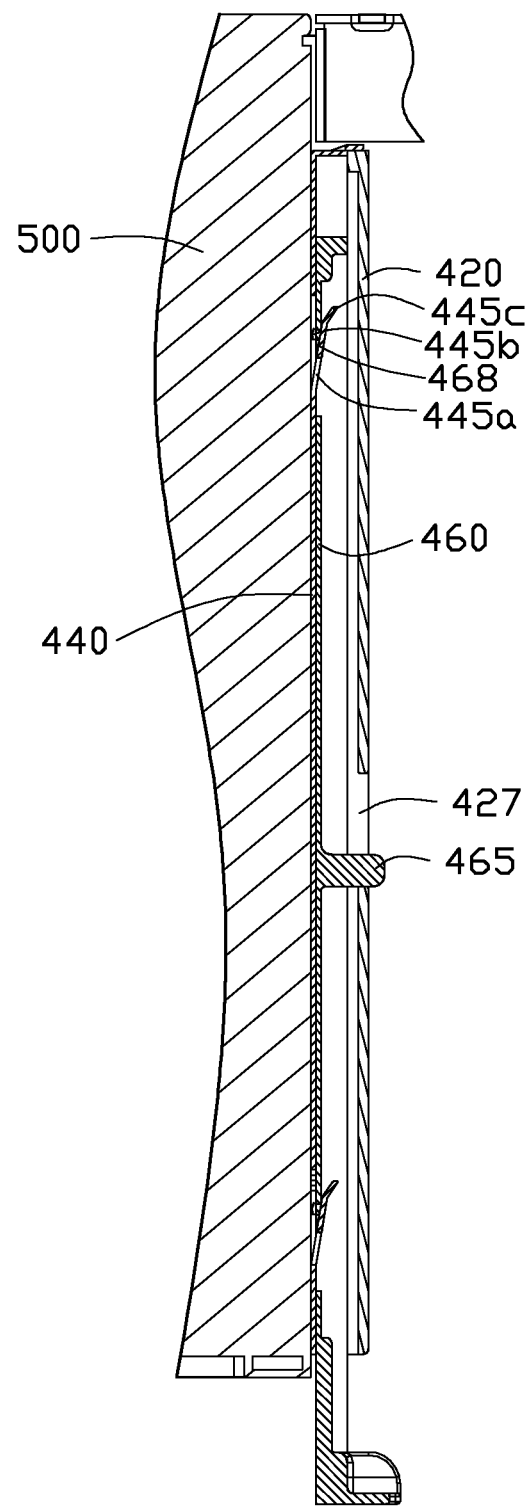
FIG. 7 is a cross-sectional view of FIG. 5, taken along the line of VII-VII.
Figure 8:
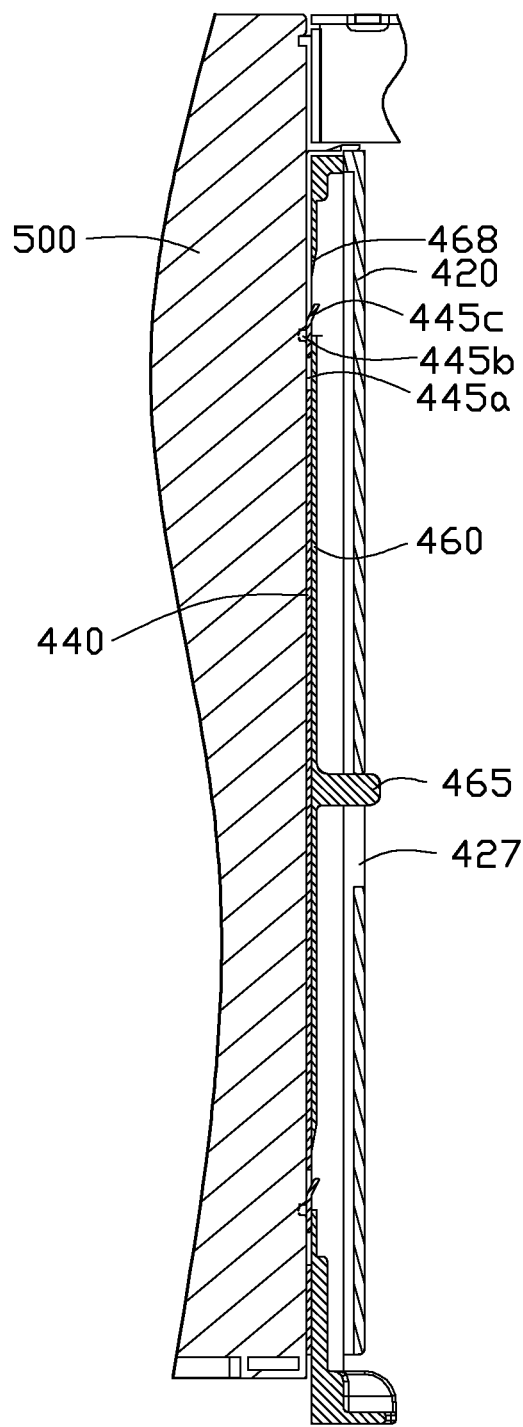
FIG. 8 is a cross-sectional view of FIG. 6, taken along the line of VIII-VIII.

FIGS. 5-8, in assembling the hard disk drive 500, the operation portion 465 is slid along the guide hole 427, until the protrusion 469 is snappingly received into the second cutout 449b. The guiding surface 468a of each abutting block 468 presses the lower portion of the distal end of the corresponding extending piece 445a, to draw the latching posts 445b back in the slide slot 443. The hard disk drive 500 is received in the receiving space 29. The second sidewall 504 is engaged with the latching piece 24 and the hook 242 is inserted into the positioning hole 508. The third sidewall 506 is engaged with the first positioning pieces 22, the end wall 507 is engaged with the second sidewall 26, and the first sidewall 502 is engaged with the connecting plate 441. The latching posts 445b are aligned with the corresponding positioning holes 508 of the first sidewall 502. The operation portion 465 is slid along the guide hole 427, such that the protrusion 469 is switched from the second cutout 449b to the first cutout 449a. The abutting blocks 468 release the latching portions 445, and each extending piece 445a is self-restored to bias a distal end of the latching post 445b into the corresponding positioning hole 508. The end wall of each receiving hole 467 further presses the corresponding extending piece 445a, to retain the latching posts 445b in the positioning holes 508.

In disassembling the hard disk drive 500, the operation portion 465 is slid along the guide hole 427, to move the protrusion 469 from the first cutout 449a to the second cutout 449b. At this time, the end walls of the receiving holes 467 release the extending pieces 445, such that each extending piece 445a is self-restored. The abutting blocks 468 further press the corresponding extending pieces 445a, to fully disengage the latching posts 445b from the corresponding positioning holes 508. Therefore, the hard disk drive 500 can be easily removed from the mounting apparatus 100.

While the disclosure describes examples and embodiments, it is to be understood that the disclosure is not limited thereto. To the contrary, the disclosure is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mounting apparatus for a hard disk drive, wherein the hard disk drive comprises a first sidewall and a second sidewall opposite to the first sidewall, the first and second sidewalls each define a positioning hole, the mounting apparatus comprising:

a supporting plate comprising a plurality of first positioning pieces for engaging with the first sidewall of the hard disk drive; and a fixing assembly comprising a positioning member mounted to the supporting plate opposite to the first positioning pieces, a latching member fixed to the positioning member, and an operation member slidably sandwiched between the positioning member and the latching member, wherein the latching member comprises a resilient latching portion and a latching post extending out from the latching portion, the operation member comprises a rectangular slide plate defining a receiving hole;

wherein the latching member defines a first cutout and a second cutout, a protrusion protrudes out from the operation member to be positioned in either the first cutout or the second cutout to respectively keep the operation member in a first position where a first end wall of the receiving hole presses the latching portion to force the latching post into the positioning hole, or in a second position where a second end wall of the receiving hole presses the latching portion to disengage latching post from the positioning hole of the second sidewall of the hard disk drive;

wherein the positioning member comprises a rectangular positioning plate, the latching member comprises a rectangular connecting plate, a receiving slot is defined between the positioning plate and the connecting plate, and the slide plate is slidably received in the receiving slot;

wherein the connecting plate defines a through hole, the latching portion comprises a cantilever shaped extending piece extending from one edge of the through hole, a guiding piece obliquely extending from a free end of the extending piece into the receiving hole, the latching post extending out from an outer surface of the extending piece away from the receiving slot, the second end wall of the receiving hole slides through the guiding piece and presses the outer surface of the extending piece, to retract the latching post back in the through hole thereby releasing the positioning hole of the second sidewall of the hard disk drive;

wherein the first end wall of the receiving hole opposite to the second end wall slidably presses an inner surface of the extending piece, to bias the latching post outward to engage the latching post into the positioning hole of the second sidewall of the hard disk drive;

wherein a flange protrudes out from two lateral sides of the positioning plate, a peripheral plate protrudes out from two lateral sides of the connecting plate, and the receiving slot is bounded by the positioning plate, the connecting plate, the flange, and the peripheral plate; and wherein the first and second cutouts are defined in an inner surface of the peripheral plate, the connecting plate and the peripheral plate cooperatively bound a slide slot, the first and second cutouts communicate with the slide slot, the protrusion protrudes out from a sidewall of the slide plate to be positioned in either the first cutout or the second cutout, the first end wall of the receiving hole presses the extending piece to force the latching post into the positioning hole, the second end wall of the receiving hole presses the extending piece to disengage latching post from the positioning hole of the second sidewall of the hard disk drive.

2. The mounting apparatus of claim 1, wherein the positioning plate defines a guide hole along a lengthwise direction of the positioning plate, and an operation portion protrudes out from the slide plate to be sliably received in and exposed through the guide hole for manual operation.

3. The mounting apparatus of claim 1, wherein an abutting block extends from a lower portion of the second end wall of the receiving hole, the guiding piece extends from a lower portion of the extending piece, the latching post extends out from an upper portion of the extending piece to avoid interference, and the abutting block defines a guiding surface guiding the guiding piece of the latching portion.

4. The mounting apparatus of claim 1, wherein a latching piece protrudes up from a first end of the supporting plate, and a hook protrudes from a distal end of the latching piece to engage into the positioning hole of the first sidewall of the hard disk drive.

5. The mounting apparatus of claim 4, wherein a second positioning piece extends up from a side of the supporting plate perpendicular to the first positioning piece for engaging with an end wall of the hard disk drive.

6. The mounting apparatus of claim 5, wherein the fixing assembly, the first positioning piece, and the second positioning piece cooperatively bound a receiving space for receiving the hard disk drive.

* * * * *